United States Patent
Wang et al.

(10) Patent No.: US 12,372,705 B2
(45) Date of Patent: Jul. 29, 2025

(54) LIGHT GUIDE PLATE WITH ASYMMETRICAL OPTICAL MICROSTRUCTURES

(71) Applicant: CM Visual Technology Corporation, Tainan (TW)

(72) Inventors: Tsang-Chi Wang, Tainan (TW); Hsin Wen Chang, Tainan (TW); Hung Yu Lin, Tainan (TW); Yung Pin Chen, Tainan (TW)

(73) Assignee: CM Visual Technology Corporation, Tainan (TW)

( * ) Notice: Subject to any disclaimer, the term of this patent is extended or adjusted under 35 U.S.C. 154(b) by 0 days.

(21) Appl. No.: 18/599,252

(22) Filed: Mar. 8, 2024

(65) Prior Publication Data

US 2025/0020852 A1 Jan. 16, 2025

Related U.S. Application Data

(60) Provisional application No. 63/526,201, filed on Jul. 12, 2023.

(51) Int. Cl.
*G02B 6/00* (2006.01)
*F21V 8/00* (2006.01)

(52) U.S. Cl.
CPC ......... *G02B 6/0043* (2013.01); *G02B 6/0038* (2013.01)

(58) Field of Classification Search
CPC .. G02B 6/0043; G02B 6/0036; G02B 6/0035; G02B 6/0033; G02B 6/0011; G02B 6/0038
See application file for complete search history.

(56) References Cited

U.S. PATENT DOCUMENTS 3,043,947 A * 7/1962 Albinger, Jr. ........ G02B 6/0028
  362/634
6,167,182 A * 12/2000 Shinohara ............ G02B 6/0046
  385/129

(Continued)

FOREIGN PATENT DOCUMENTS

CN      102681084       9/2012
JP       3151830        4/2001

(Continued)

OTHER PUBLICATIONS

"Office Action of Taiwan Counterpart Application", issued on Feb. 10, 2025, p. 1-p. 9.

(Continued)

*Primary Examiner* — Ismael Negron
(74) *Attorney, Agent, or Firm* — JCIPRNET

(57) ABSTRACT

A light guide plate includes a light incident surface, a first surface connected to the light incident surface, and a plurality of optical microstructures disposed on the first surface. Each optical microstructure has a first cross-sectional profile along a first direction and a second cross-sectional profile along a second direction perpendicular to the first direction. The first cross-sectional profile is different from the second cross-sectional profile. The optical microstructures include a plurality of first optical microstructures and a plurality of second optical microstructures. The second cross-sectional profile of each first optical microstructure is different from the second cross-sectional profile of each second optical microstructure. A light source module including the light guide plate projects light into the light incident surface.

18 Claims, 4 Drawing Sheets

(56) References Cited

U.S. PATENT DOCUMENTS

| | | | |
|---|---|---|---|
| 6,485,157 B2 * | 11/2002 | Ohkawa | G02B 6/0036 362/333 |
| 6,746,129 B2 * | 6/2004 | Ohkawa | G02B 6/0021 362/625 |
| 6,752,505 B2 * | 6/2004 | Parker | G02B 6/0036 362/330 |
| 7,121,709 B2 * | 10/2006 | Shinohara | G02B 6/0038 362/330 |
| 7,163,330 B2 * | 1/2007 | Matsui | G02B 6/0038 362/603 |
| 7,364,341 B2 * | 4/2008 | Parker | G02B 5/045 362/330 |
| 7,507,011 B2 * | 3/2009 | Ueno | G02B 6/0028 362/625 |
| 7,824,094 B2 * | 11/2010 | Hsieh | G02B 6/0061 362/613 |
| 9,632,231 B2 | 4/2017 | Zhou | |
| 10,281,640 B2 * | 5/2019 | Montgomery | G02B 6/0068 |
| 10,613,389 B2 | 4/2020 | Liu et al. | |
| 2008/0316744 A1 * | 12/2008 | Hirota | G02B 6/0036 362/247 |
| 2009/0097274 A1 * | 4/2009 | Shinohara | G02B 6/0051 359/599 |

FOREIGN PATENT DOCUMENTS

| | | |
|---|---|---|
| JP | 2002062435 | 2/2002 |
| JP | 2005353544 | 12/2005 |
| JP | 2009176562 | 8/2009 |
| JP | 2009176592 | 8/2009 |
| TW | I409544 | 9/2013 |
| WO | 2007123180 | 11/2007 |

OTHER PUBLICATIONS

"Office Action of Japan Counterpart Application", issued on May 13, 2025, pp. 1-6.

* cited by examiner

LIGHT GUIDE PLATE WITH ASYMMETRICAL OPTICAL MICROSTRUCTURES

CROSS-REFERENCE TO RELATED APPLICATION

This application claims the priority benefit of U.S. provisional application Ser. No. 63/526,201, filed on Jul. 12, 2023. The entirety of the above-mentioned patent application is hereby incorporated by reference herein and made a part of this specification.

BACKGROUND

Technical Field

The invention relates to a light source module, and in particular, to a light source module having a light guide plate.

Description of Related Art

As non-self-luminous displays such as liquid crystal displays are increasingly widely used, the design of backlight modules also needs to be adjusted for different usage scenarios. Among them, an edge-type backlight module has become the mainstream in the market because it can meet the demand for thinner display devices. Generally, the edge-type backlight module includes a light guide plate and a light source. The light source is disposed on an edge-side surface of the light guide plate to significantly reduce the thickness of backlight module. However, such a design may cause uneven light distribution (for example, light spots phenomenon) due to discontinuous distribution of the light source with power-saving characteristics on the edge-side of the light guide plate.

SUMMARY

In view of the foregoing problems, the disclosure provides a light guide plate and a light source module with better uniformity of luminous distribution.

The disclosure provides a light guide plate including a light incident surface, a first surface and a plurality of optical microstructures. The first surface is connected to the light incident surface. The optical microstructures are disposed on the first surface. Each of the optical microstructures has a first cross-sectional profile along a first cross-section and a second cross-sectional profile along a second cross-section. The first cross-section is perpendicular to the second cross-section. The first cross-sectional profile is different from the second cross-sectional profile. The optical microstructures include a plurality of first optical microstructures and a plurality of second optical microstructures. The second cross-sectional profile of each first optical microstructure is different from the second cross-sectional profile of each second optical microstructure.

The disclosure provides a light source module including a light guide plate and a light source. The light guide plate includes a light incident surface, a first surface and a plurality of optical microstructures. The first surface is connected to the light incident surface. The optical microstructures are disposed on the first surface. Each of the optical microstructures has a first cross-sectional profile along a first cross-section and a second cross-sectional profile along a second cross-section. The first cross-section is perpendicular to the second cross-section. The first cross-sectional profile is different from the second cross-sectional profile. The optical microstructures include a plurality of first optical microstructures and a plurality of second optical microstructures. The second cross-sectional profile of each first optical microstructure is different from the second cross-sectional profile of each second optical microstructure. The light source is disposed on one side of the light incident surface of the light guide plate.

Based on the above, in the light source module according to an embodiment of the disclosure, each of the optical microstructures disposed on the first surface of the light guide plate is asymmetric with respect to a cross-section parallel to the light incident surface of the light guide plate. The cross-sectional profile of each of one part of the optical microstructures along the cross-section is different from the cross-sectional profile of each of another part of the optical microstructures along the cross-section. Accordingly, the uniformity of light distribution of the light guide plate may be significantly improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
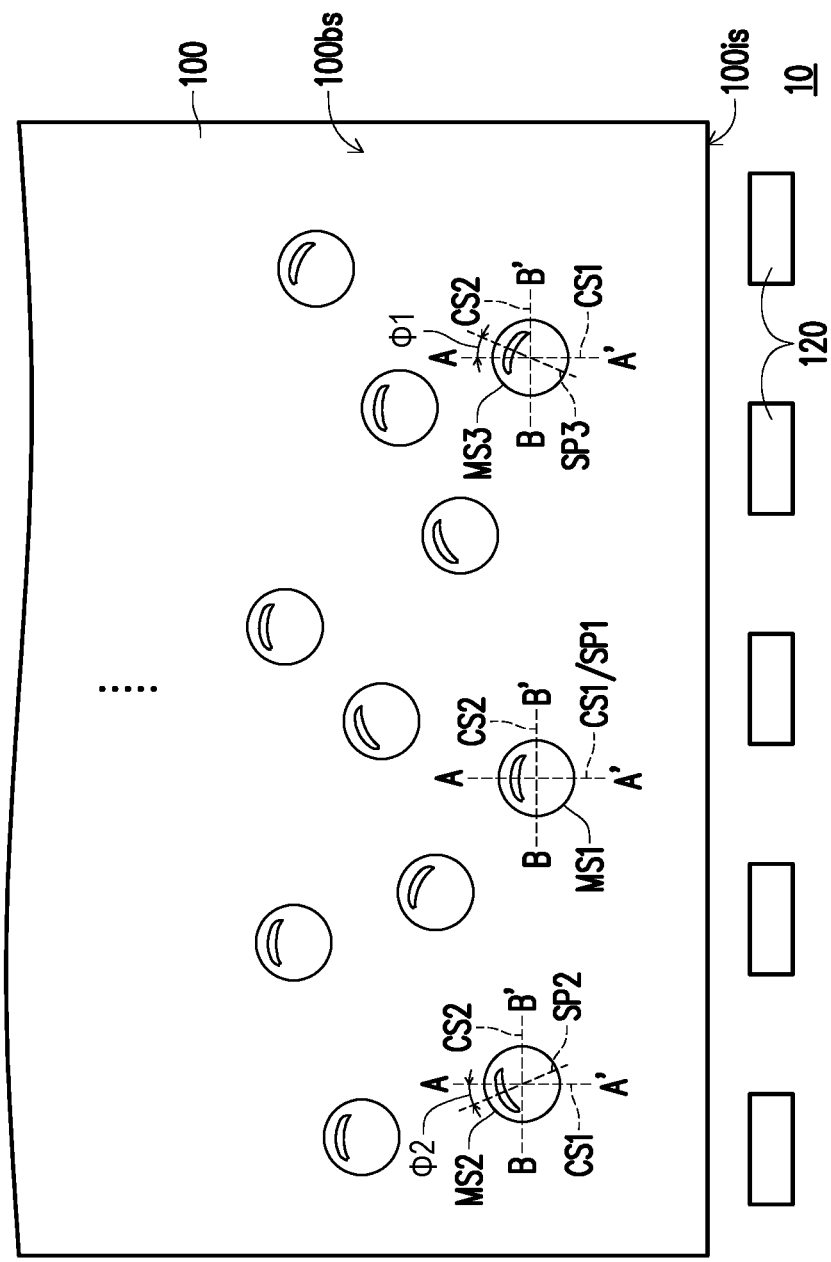
FIG. 1 is a schematic bottom view of a light source module according to one embodiment of the disclosure.
Figure 2A:
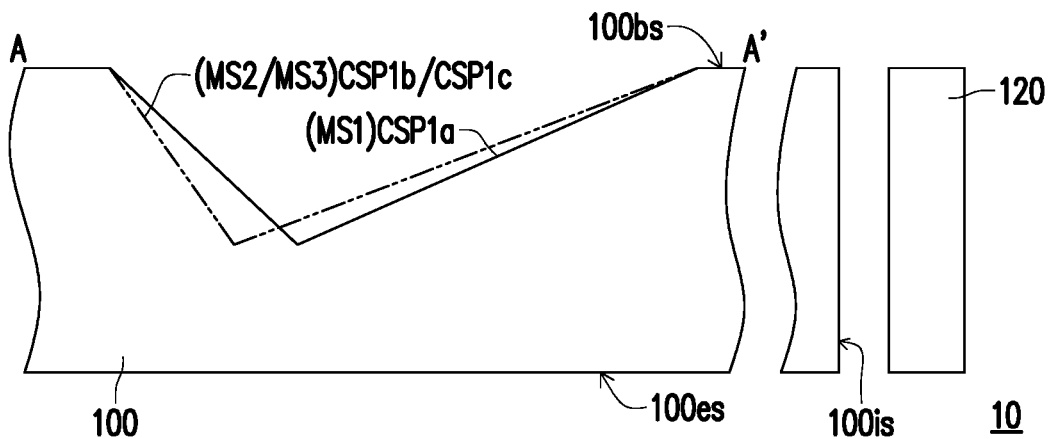
FIG. 2A and FIG. 2B are schematic cross-sectional view of the light source module in FIG. 1.
Figure 2B:
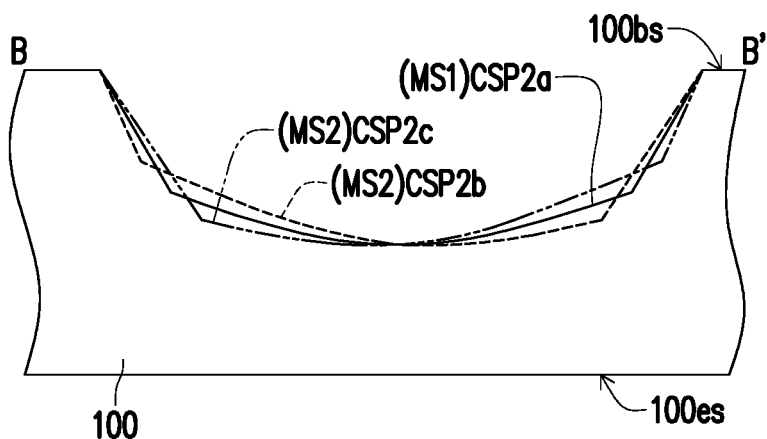

FIG. 1 is a schematic bottom view of a light source module according to one embodiment of the disclosure. FIG. 2A and FIG. 2B are schematic cross-sectional view of the light source module in FIG. 1. FIG. 2A corresponds to the three section lines A-A' in FIG. 1. FIG. 2B corresponds to the three section lines B-B' in FIG. 1. It should be noted that the orthographic projection of the first cross-section CS1 of each optical microstructure on the first surface 100bs is defined as the section line A-A'. Similarly, the orthographic projection of the second cross-section CS2 of each optical microstructure on the first surface 100bs is defined as the section line B-B'.

Referring to FIG. 1, FIG. 2A and FIG. 2B, a light source module 10 includes a light guide plate 100 and a light source 120. The light guide plate 100 has a light incident surface 100is, a first surface 100bs and a second surface 100es. The second surface 100es and the first surface 100bs are opposite to each other and connected to the light incident surface 100is. The light source 120 is disposed on one side of the light incident surface 100is of the light guide plate 100. The light source 120 may include a plurality of light emitting diodes arranged at intervals along a direction parallel to the light incident surface 100is and the first surface 100bs, but the disclosure is not limited thereto.

The light guide plate 100 further has a plurality of optical microstructures disposed on the first surface 100bs of the light guide plate 100. The optical microstructures are configured to deflect light beams (not illustrated) emitted from the light source 120 and transmitted in the light guide plate 100 to the second surface 100es. In particular, each of the optical microstructures has an asymmetric structure. More specifically, each optical microstructure has two different cross-sectional profiles along two cross-sections perpendicular to each other. In the embodiment, the asymmetric structures of the optical microstructures may be the same but arranged in different ways.

From another point of view, each of the optical microstructures may has a first cross-sectional profile along a first cross-section CS1 and a second cross-sectional profile along a second cross-section CS2. The first cross-section CS1 is perpendicular to the second cross-section CS2. The first cross-section CS1 intersects the light incident surface 100is. In the embodiment, for example, the first cross-section CS1 may be perpendicular to the light incident surface 100is. At least two parts of the optical microstructures have different first cross-sectional profiles or different second cross-sectional profiles.

In the embodiment, for example, the optical microstructures may include a plurality of optical microstructures MS1, a plurality of optical microstructures MS2 and a plurality of optical microstructures MS3. Each optical microstructure MS1 has only one symmetry plane SP1 coincident with the first cross-section CS1, which means the symmetry plane SP1 of each optical microstructure MS1 is perpendicular to the light incident surface 100is. Each optical microstructure MS2 has only one symmetry plane SP2, and the symmetry plane SP2 is rotated counterclockwise by an angle $\phi 2$ relative to the first cross-section CS1. Similarly, each optical microstructure MS3 has only one symmetry plane SP3, and the symmetry plane SP3 is rotated clockwise by an angle $\phi 1$ relative to the first cross-section CS1.

From another perspective, the second cross-sectional profile CSP2a of each optical microstructure MS1, the second cross-sectional profile CSP2b of each optical microstructure MS2 and the second cross-sectional profile CSP2c of each optical microstructure MS3 are different from each other. The first cross-sectional profile CSP1a of each optical microstructure MS1 is different from the first cross-sectional profile CSP1b of each optical microstructure MS2 and the first cross-sectional profile CSP1c of each optical microstructure MS3.

In the embodiment, the first cross-sectional profile CSP1b of each optical microstructure MS2 may be the same as the first cross-sectional profile CSP1c of each optical microstructure MS3, which means the rotated angle $\phi 2$ of each optical microstructure MS2 may be the same as the rotated angle $\phi 1$ of each optical microstructure MS3, but the disclosure is not limited thereto. In another embodiment, the angle $\phi 2$ through which each optical microstructure MS2 rotates may be different from the angle $\phi 1$ through which each optical microstructure MS3 rotates, which means the first cross-sectional profile CSP1b of each optical microstructure MS2 may be different from the first cross-sectional profile CSP1c of each optical microstructure MS3.

It should be noted that the line shapes of the cross-sectional profiles in FIG. 2A and FIG. 2B are for illustrative purpose only, and the disclosure is not limited thereto.

According to the aforementioned configuration of the optical microstructures MS1, the optical microstructures MS2 and the optical microstructures MS3, the uniformity of light distribution of the light guide plate 100 may be significantly improved. In particular, the light spots phenomenon that mainly occurs near the side of the light guide plate 100 provided with the light source 120 may be alleviated.

In the following, other embodiments are provided to explain the disclosure in detail, wherein same components will be denoted by the same reference numerals, and the description of the same technical content will be omitted. The descriptions regarding the omitted part may be referred to the previous embodiment, and thus will not be repeated herein.

Figure 3:
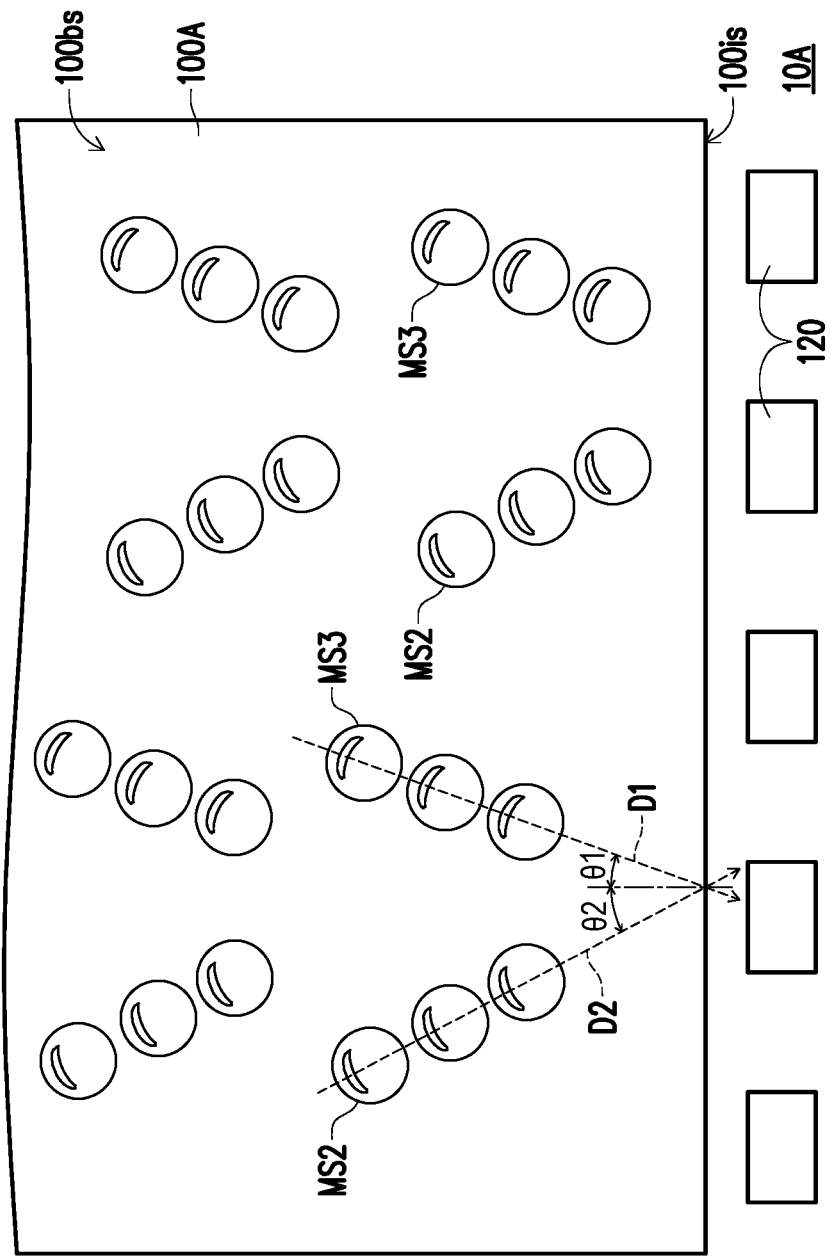
FIG. 3 is a schematic bottom view of a light source module according to another embodiment of the disclosure.

FIG. 3 is a schematic bottom view of a light source module according to another embodiment of the disclosure. Referring to FIG. 3, the difference between the light source module 10A of the embodiment and the light source module 10 in FIG. 1 lies in the arrangement of the optical microstructures.

Unlike the randomly arranged optical microstructures in FIG. 1, the plurality of optical microstructures of present embodiment may be arranged in at least one direction. In the embodiment, for example, the optical microstructures MS2 may be arranged in a direction D2, and the optical microstructures MS3 may be arranged in a direction D1. It is worth mentioning that the direction D1 and the direction D2 are not perpendicular and not parallel to the light incident surface 100*is,* and the direction D1 intersects the direction D2.

More specifically, the arrangement direction (i.e. direction D2) of the optical microstructures MS2 is rotated counterclockwise by an angle θ2 relative to a normal direction of the light incident surface 100*is,* and the arrangement direction (i.e. direction D1) of the optical microstructures MS3 is rotated clockwise by an angle θ1 relative to the normal direction of the light incident surface 100*is.* In the embodiment, the angle θ1 may be different from the angle θ2, but the disclosure is not limited thereto. In another embodiment, the angle θ1 may be the same as the angle θ2.

In the embodiment, the symmetry plane (e.g. the symmetry plane SP2 as illustrated in FIG. 1) of each optical microstructure MS2 may be parallel to the direction D2, and the symmetry plane (e.g. the symmetry plane SP3 as illustrated in FIG. 1) of each optical microstructure MS3 may be parallel to the direction D1. However, the disclosure is not limited thereto. In another embodiment, the symmetry plane of each optical microstructure MS2 may intersect the direction D2, and the symmetry plane of each optical microstructure MS3 may intersect the direction D1.

According to the aforementioned configuration of the optical microstructures MS2 and the optical microstructures MS3, the uniformity of light distribution of the light guide plate 100A may be significantly improved. In particular, the light spots phenomenon that mainly occurs near the side of the light guide plate 100A provided with the light source 120 may be alleviated.

Figure 4:
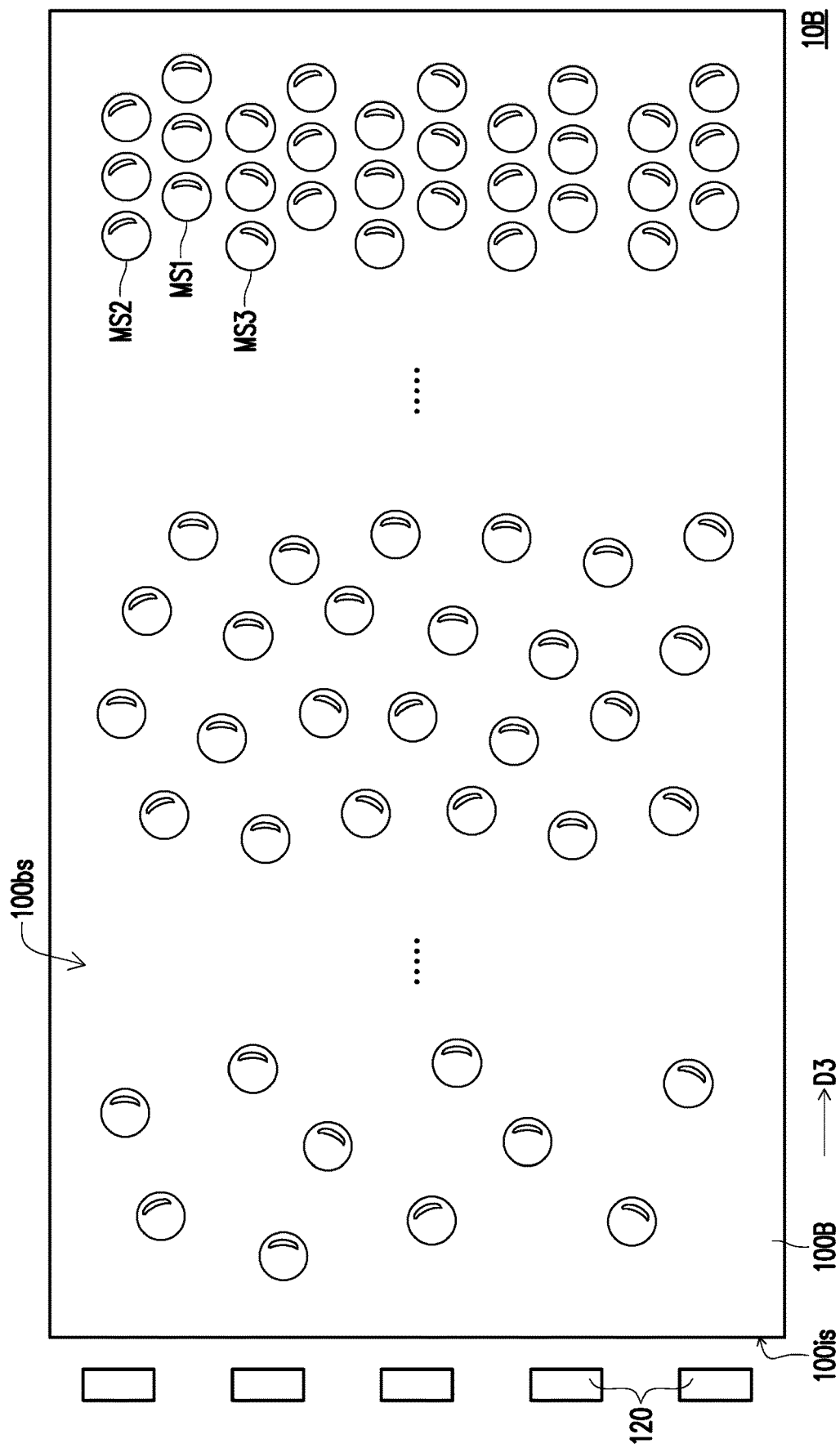
FIG. 4 is a schematic bottom view of a light source module according to still another embodiment of the disclosure.

FIG. 4 is a schematic bottom view of a light source module according to still another embodiment of the disclosure. Referring to FIG. 4, the difference between the light source module 10B of the embodiment and the light source module 10 in FIG. 1 lies in the arrangement of the optical microstructures. Specifically, a distribution density of the optical microstructures on the first surface 100*bs* increases along a direction (e.g. direction D3) away from the light incident surface 100*is.* Therefore, compared with the light source module 10 in FIG. 1, the uniformity of light distribution of the light guide plate 100B may be further improved.

Since the configuration of orientations of the optical microstructure MS1, the optical microstructure MS2 and the optical microstructure MS3 of present embodiment is similar to the optical microstructure MS1, the optical microstructure MS2 and the optical microstructure MS3 in FIG. 1, please refer to the relevant paragraphs of the foregoing embodiments for detailed description and will not be repeated here.

In summary, in the light source module according to an embodiment of the disclosure, each of the optical microstructures disposed on the first surface of the light guide plate is asymmetric with respect to a cross-section parallel to the light incident surface of the light guide plate. The cross-sectional profile of each of one part of the optical microstructures along the cross-section is different from the cross-sectional profile of each of another part of the optical microstructures along the cross-section. Accordingly, the uniformity of light distribution of the light guide plate may be significantly improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A light guide plate, comprising:
a light incident surface;
a first surface, connected to the light incident surface; and
a plurality of optical microstructures, disposed on the first surface, wherein each of the optical microstructures has a first cross-sectional profile along a first cross-section and a second cross-sectional profile along a second cross-section, the first cross-section is perpendicular to the second cross-section, the first cross-sectional profile is different from the second cross-sectional profile, an orthographic projection profile of each of the optical microstructures is circular, the optical microstructures includes a plurality of first optical microstructures and a plurality of second optical microstructures, the second cross-sectional profile of each first optical microstructure is different from the second cross-sectional profile of each second optical microstructure, the first optical microstructures are arranged in a first direction, the second optical microstructures are arranged in a second direction, the first direction intersects the second direction, each of the first optical microstructures and the second optical microstructures has a symmetry plane coincident with the first cross-section and not being perpendicular to the light incident surface, the symmetry planes of the first optical microstructures are parallel to each other, the symmetry planes of the second optical microstructures are parallel to each other and intersect the symmetry planes of the first optical microstructures, the first optical microstructures includes a first group and a second group, the symmetry planes of the first group of the first optical microstructures are coplanar, the symmetry planes of the second group of the first optical microstructures are coplanar, the symmetry planes of the first group of the first optical microstructures are not coplanar with the symmetry planes of the second group of the first optical microstructures, and the first group of the first optical microstructures does not overlap the second group of the first optical microstructures along the first direction.

2. The light guide plate according to claim 1, wherein the first cross-sectional profile of each first optical microstructure is different from the first cross-sectional profile of each second optical microstructure.

3. The light guide plate according to claim 1, wherein a distribution density of the optical microstructures on the first surface increases along a direction away from the light incident surface.

4. The light guide plate according to claim 1, wherein the optical microstructures further include a plurality of third optical microstructures, and the second cross-sectional profile of each third optical microstructure is different from the second cross-sectional profile of each of the first optical microstructures and the second optical microstructures.

5. The light guide plate according to claim 4, wherein the first cross-sectional profile of each second optical microstructure is the same as the first cross-sectional profile of each third optical microstructure.

6. The light guide plate according to claim 5, wherein the first cross-sectional profile of each first optical microstructure is different from the first cross-sectional profile of each second optical microstructure.

7. The light guide plate according to claim 1, wherein the first direction is not perpendicular to the light incident surface.

8. The light guide plate according to claim 7, wherein the second direction is not perpendicular to the light incident surface.

9. The light guide plate according to claim 8, wherein the first direction and the second direction are not parallel to the light incident surface.

10. A light source module, comprising:
a light guide plate, comprising:
a light incident surface;
a first surface, connected to the light incident surface; and
a plurality of optical microstructures, disposed on the first surface, wherein each of the optical microstructures has a first cross-sectional profile along a first cross-section and a second cross-sectional profile along a second cross-section, the first cross-section is perpendicular to the second cross-section, the first cross-sectional profile is different from the second cross-sectional profile, an orthographic projection profile of each of the optical microstructures is circular, the optical microstructures includes a plurality of first optical microstructures and a plurality of second optical microstructures, the second cross-sectional profile of each first optical microstructure is different from the second cross-sectional profile of each second optical microstructure, the first optical microstructures are arranged in a first direction, the second optical microstructures are arranged in a second direction, the first direction intersects the second direction, each of the first optical microstructures and the second optical microstructures has a symmetry plane coincident with the first cross-section and not being perpendicular to the light incident surface, the symmetry planes of the first optical microstructures are parallel to each other, the symmetry planes of the second optical microstructures are parallel to each other and intersect the symmetry planes of the first optical microstructures, the first optical microstructures includes a first group and a second group, the symmetry planes of the first group of the first optical microstructures are coplanar, the symmetry planes of the second group of the first optical microstructures are coplanar, the symmetry planes of the first group of the first optical microstructures are not coplanar with the symmetry planes of the second group of the first optical microstructures, and the first group of the first optical microstructures does not overlap the second group of the first optical microstructures along the first direction; and
a light source, disposed on one side of the light incident surface of the light guide plate.

11. The light source module according to claim 10, wherein the first cross-sectional profile of each first optical microstructure is different from the first cross-sectional profile of each second optical microstructure.

12. The light source module according to claim 10, wherein a distribution density of the optical microstructures on the first surface increases along a direction away from the light incident surface.

13. The light source module according to claim 10, wherein the optical microstructures further include a plurality of third optical microstructures, and the second cross-sectional profile of each third optical microstructure is different from the second cross-sectional profile of each of the first optical microstructures and the second optical microstructures.

14. The light source module according to claim 13, wherein the first cross-sectional profile of each second optical microstructure is the same as the first cross-sectional profile of each third optical microstructure.

15. The light source module according to claim 14, wherein the first cross-sectional profile of each first optical microstructure is different from the first cross-sectional profile of each second optical microstructure.

16. The light source module according to claim 10, wherein the first direction is not perpendicular to the light incident surface.

17. The light source module according to claim 16, wherein the second direction is not perpendicular to the light incident surface.

18. The light source module according to claim 17, wherein the first direction and the second direction are not parallel to the light incident surface.

* * * * *